(12) United States Patent
Gonze et al.

(10) Patent No.: US 7,886,529 B2
(45) Date of Patent: Feb. 15, 2011

(54) ELECTRICALLY HEATED DPF/SCR 2-WAY SYSTEM

(75) Inventors: Eugene V. Gonze, Pinckney, MI (US); Michael J. Paratore, Jr., Howell, MI (US); Yongsheng He, Sterling Heights, MI (US)

(73) Assignee: GM Global Technology Operations, Inc.

( * ) Notice: Subject to any disclaimer, the term of this patent is extended or adjusted under 35 U.S.C. 154(b) by 930 days.

(21) Appl. No.: 11/807,925

(22) Filed: May 30, 2007

(65) Prior Publication Data

US 2008/0295482 A1 Dec. 4, 2008

(51) Int. Cl.
*F01N 3/00* (2006.01)
*F01N 3/10* (2006.01)
*F01N 3/02* (2006.01)
*B01D 46/00* (2006.01)

(52) U.S. Cl. ............ 60/295; 60/274; 60/286; 60/300; 60/301; 60/303; 60/311; 95/278; 95/283; 95/285

(58) Field of Classification Search ............ 60/273, 60/285, 286, 295, 297, 300, 303, 311, 324, 60/274, 301; 95/278, 279, 283, 285
See application file for complete search history.

(56) References Cited

U.S. PATENT DOCUMENTS

| 4,329,162 | A | * | 5/1982 | Pitcher, Jr. ............ 55/523 |
| 4,505,726 | A | | 3/1985 | Takeuchi |
| 4,516,993 | A | | 5/1985 | Takeuchi |
| 4,829,766 | A | * | 5/1989 | Henkel ............ 60/303 |
| 7,062,904 | B1 | * | 6/2006 | Hu et al. ............ 60/286 |
| 2004/0221572 | A1 | * | 11/2004 | Treiber ............ 60/297 |
| 2006/0075745 | A1 | * | 4/2006 | Cummings ............ 60/315 |
| 2006/0272319 | A1 | | 12/2006 | Dettling et al. |

FOREIGN PATENT DOCUMENTS

| EP | 1291514 A2 | * | 3/2003 |
| JP | 2001173432 A | | 6/2001 |
| JP | 2002097931 A | * | 4/2002 |
| WO | WO2004/067927 | | 8/2004 |

* cited by examiner

*Primary Examiner*—Thomas E Denion
*Assistant Examiner*—Audrey Klasterka

(57) ABSTRACT

An exhaust system may include a canister that is disposed downstream from an engine. A particulate filter (PF) is disposed within the canister and filters particulates within an exhaust from the engine. A reducing catalyst is disposed within the canister, is on the PF, and promotes reaction of a liquid reductant in the exhaust after reception by the PF. A heating element is disposed within the canister and heats particulate matter in the PF.

21 Claims, 8 Drawing Sheets

ELECTRICALLY HEATED DPF/SCR 2-WAY SYSTEM

FIELD

The present disclosure relates to particulate filters and more particularly to regeneration techniques of the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A diesel combustion cycle produces particulates that are typically filtered from a diesel exhaust gas by a particulate filter (PF). The PF is disposed in an exhaust system of a corresponding diesel engine. The PF reduces emissions of particulate matter (soot) that is generated during a heterogeneous combustion process. Over time, the PF becomes full and trapped diesel particulates must be removed. During a regeneration process, the diesel particulates are burned within the PF.

An engine control system can estimate the particulate accumulation and determine when the filter needs regeneration. Once it is determined that the filter is full or filled to a predetermined level of particulate, the control system enables regeneration by modifying the combustion process and/or injecting fuel into the exhaust system. The fuel is injected into the exhaust stream after a main combustion event. The post-injected fuel is combusted over one or more catalysts of the PF. The heat released during combustion of the injected fuel on the catalysts increases the exhaust temperature, which burns the trapped soot particles in the PF. The elevated exhaust temperatures initiate oxidation of the stored soot within the PF. This approach can result in higher temperature excursions than desired, which can be detrimental to exhaust system components including the PF.

To minimize nitrogen oxide (NOx) emissions, portions of the PF may have selective catalyst reduction (SCR) elements. This type of PF is sometimes referred to as a 2-way diesel particulate filter (DPF)/SCR element. Although the 2-way DPF/SCR element reduces costs of an exhaust system, the performance of the SCR elements during regeneration is significantly reduced. A regeneration process can require 20-30 minutes of time to complete. During this period a majority of the PF is heated to temperatures of approximately 600-650° C. At these temperatures, the efficiency of the SCR elements to remove NOx is substantially reduced and thus the SCR elements are considered inactive.

SUMMARY

Accordingly, an exhaust system may include a canister that is disposed downstream from an engine. A particulate filter (PF) is disposed within the canister and filters particulates within an exhaust from the engine. A reducing catalyst is disposed within the canister, is on the PF, and promotes reaction of a liquid reductant in the exhaust after reception by the PF. A heating element is disposed within the canister and heats particulate matter in the PF.

In other features, a particulate filter (PF) is disposed downstream from an engine and filters particulates within an exhaust from the engine. A reducing catalyst coats at least a portion of the PF and promotes reaction of a liquid reductant in the exhaust. A heating element heats particulate matter in the PF.

In yet other features, a method of performing a regeneration process within an exhaust system includes passing an exhaust from an engine through a heating element. Particulate matter in a particulate filter (PF) is heated via the heating element. Particulates from the exhaust are filtered with the PF. A liquid reductant is reacted with the exhaust via a reducing catalyst on the PF.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

Figure 1:
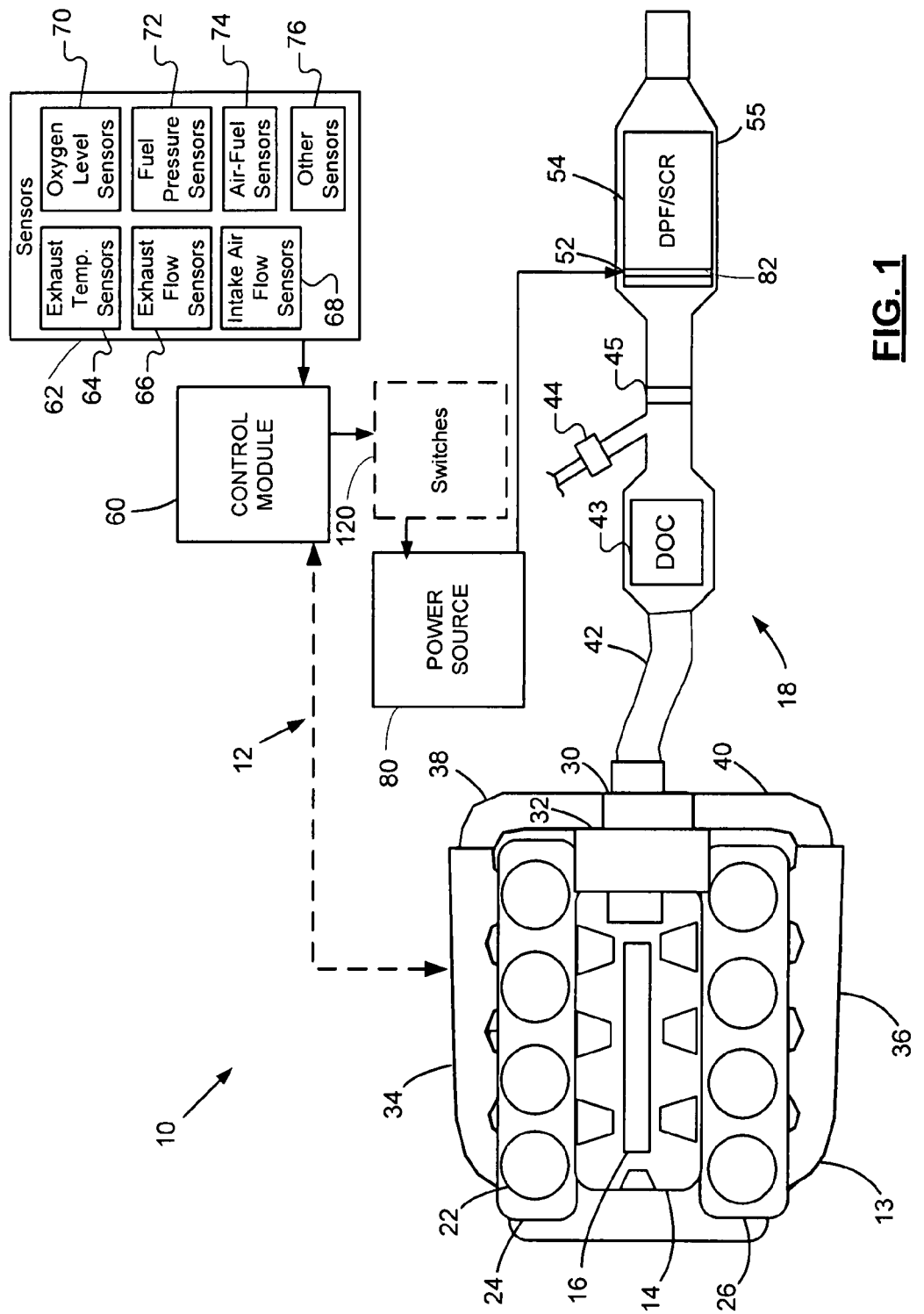
FIG. 1 is a functional block diagram of an exemplary diesel engine system including an exhaust particulate filter (PF) system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring to FIG. 1, a functional block diagram of an exemplary diesel engine system 10 including an exhaust particulate filter (PF) system 12 is shown. It is appreciated that the diesel engine system 10 is merely exemplary in nature and that the zone heated particulate filter regeneration system described herein can be implemented in various engine systems that have a particulate filter. Such engine systems may include, but are not limited to, gasoline direct injection engine systems and homogeneous charge compression ignition engine systems.

The engine system 10 includes a diesel engine 13, an intake manifold 14, a common rail fuel injection system 16 and an exhaust system 18. The engine 13 combusts an air and fuel mixture to produce drive torque. The engine 13 includes eight cylinders 22 configured in adjacent cylinder banks 24, 26 in V-type layout. Although FIG. 1 depicts eight cylinders (N=8), it can be appreciated that the engine 13 may include additional or fewer cylinders. For example, engines having 2, 4, 5, 6, 8, 10, 12 and 16 cylinders are contemplated. It is also anticipated that the particulate filter regeneration control of the present invention can be implemented in an inline-type or another type of cylinder configuration.

Air is drawn into the intake manifold 14 through a throttle. Air is drawn into the cylinders 22 from the intake manifold 14 and is compressed therein. Fuel is injected into cylinders 22 by the common rail injection system 16 and the heat of the compressed air ignites the air/fuel mixture. The exhaust gases are exhausted from the cylinders 22 into the exhaust system 18. In some instances, the engine system 10 can include a turbocharger that uses an exhaust driven turbine 30 to drive a compressor 32 that compresses the air entering the intake manifold 14. The compressed air typically passes through an air cooler (not shown) before entering into the intake manifold 14.

The exhaust system 18 includes exhaust manifolds 34, 36, exhaust conduits 38, 40, and 42, and the PF system 12, which for the embodiment shown may be referred to as a diesel PF system. The exhaust manifolds 34, 36 direct the exhaust exiting corresponding cylinder banks 24, 26 into the exhaust conduits 38, 40. Optionally, an EGR valve re-circulates a portion of the exhaust back into the intake manifold 24. The remainder of the exhaust is directed into the turbocharger to drive the turbine 30. The turbine 30 facilitates the compression of the fresh air received from the intake manifold 14. A combined exhaust stream flows from the turbocharger through the exhaust conduit 42 and the PF system 12. When included, the exhaust may flow through the conduit 42, through a diesel oxidation catalyst (DOC) 43, receives a liquid reductant via a liquid reductant injector 44, and through a mixer 45 prior to entering the PF system 12. The liquid reductant may include urea, ammonia, or some other liquid reductant. Liquid reductant is injected into the exhaust stream to react with NOx to generate water vapor ($H_2O$) and $N_2$ (nitrogen gas).

Figure 7:
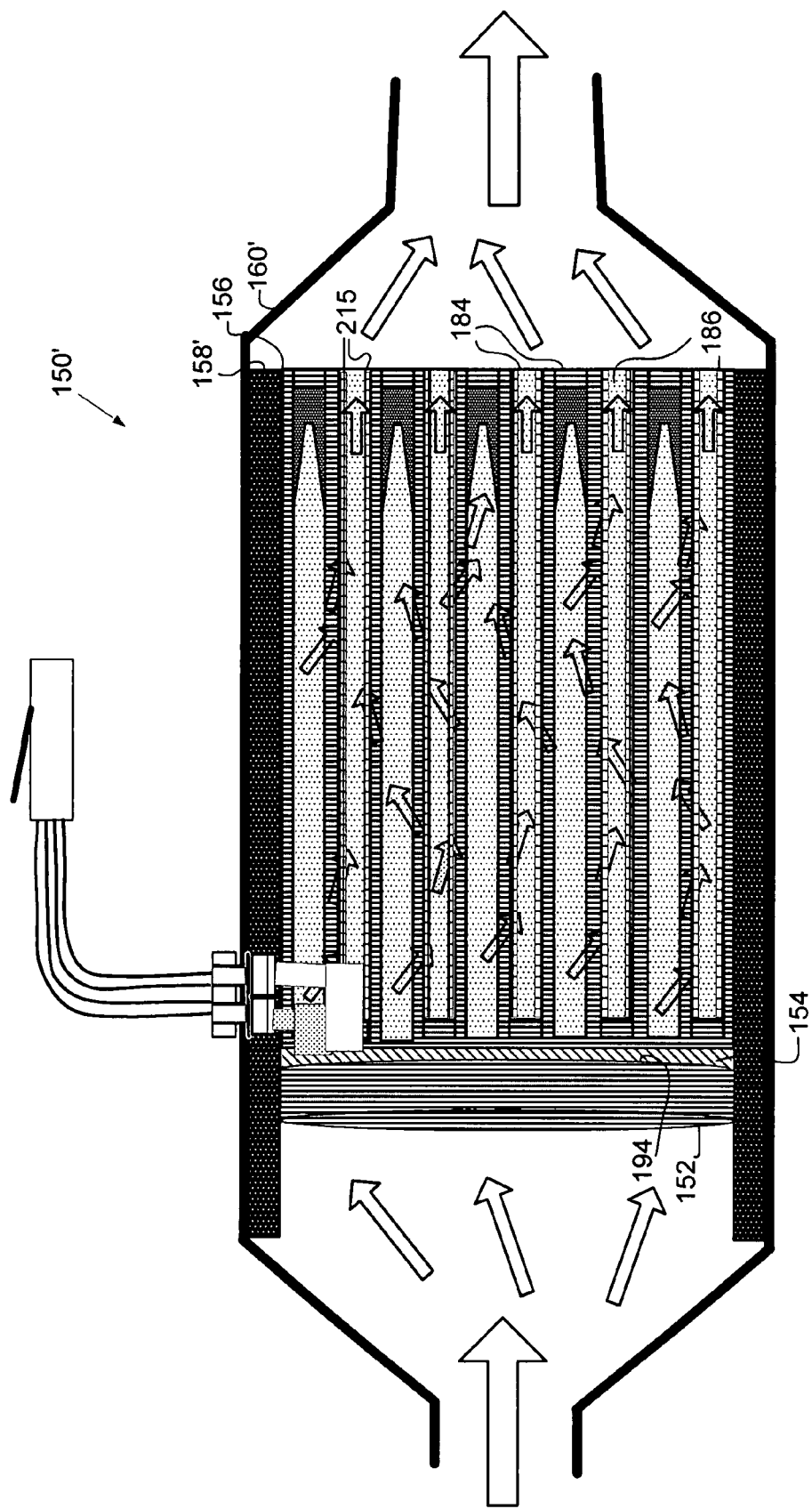
FIG. 7 is a cross-sectional side view of a PF system in accordance with another embodiment of the present disclosure.

The PF system 12 includes a heating element 52 and a PF/selective catalyst reduction (SCR) element 54, which are within a housing 55. The PF/SCR 54 may be referred to as a 2-way element or a 2-way PF and is shown as a diesel particulate filter (DPF)/SCR for the stated embodiment. The PF/SCR element 54 may include a catalyst substrate/flow converter, which is best seen in FIG. 7. The PF system 12 filters particulates from the combined exhaust stream from the exhaust conduits 38, 40 prior to entering the atmosphere. The PF system 12 promotes reaction between a liquid reductant and NOx. The PF system 12 may also oxidize the exhaust based on the post combustion air/fuel ratio. The amount of oxidation increases the temperature of the exhaust.

The heating element 52 increases the temperature of the front surface of the PF/SCR element 54, which initiates burning of collected soot therein. The PF/SCR element 54 receives exhaust from the engine 13 and filters soot particulates present in the exhaust. The PF portion of the PF/SCR element 54 may be formed of ceramic material, a silicon carbide material, a metallic material, or other suitable materials.

A control module 60 regulates operation of the system 10 according to the oxygen based particulate filter regeneration method of the present disclosure. The system 10 may include various sensors 62, such as exhaust temperature sensors 64, exhaust flow sensors 66, intake air flow sensors 68, oxygen level sensors 70, fuel pressure sensors 72, air-fuel sensors 74, and other sensors 76 for status determination and control of the system 10. The control module 60 determines when regeneration is needed and controls engine operation to allow regeneration to occur. Based on status signals received from the sensors 62, the control module 60 controls engine operation at regeneration levels throughout the regeneration process.

A control module 60 controls the engine 13 and PF regeneration based on various sensed information. More specifically, the control module 60 estimates loading of the PF/SCR element 54. When the estimated loading achieves a threshold level (e.g., 5 grams/liter of particulate matter) and the exhaust flow rate is within a desired range. Current is controlled to the heating element 52 and provided via the control module 60 and a power source 80 to initiate the regeneration process. The current from the power source may be supplied directly to the heating element 52, as shown, or supplied to the control module 60 prior to being received by the heating element 52. The duration of the regeneration process varies based upon the amount of particulate matter within the PF/SCR 54. It is anticipated, that the regeneration process can last between 2-6 minutes.

Current is applied to the heating element 52 during an initial portion of the regeneration process. More specifically, the electric energy heats a front surface 82 of the PF/SCR element 54 for a threshold period (e.g., 1-2 minutes). Exhaust passing through the front surface 82 is heated. The remainder of the regeneration process is achieved using the heat generated by combustion of particulate matter present near the front surface 82 or by the heated exhaust passing through the PF/SCR element 54. For a further explanation or examples of zoning and heating element control see U.S. patent application Ser. No. 11/233,450 filed on Mar. 22, 2006 and entitled, "Zoned Heated Inlet Ignited Diesel Particulate Filter Regeneration", which is incorporated by reference in its entirety herein.

Figure 2:
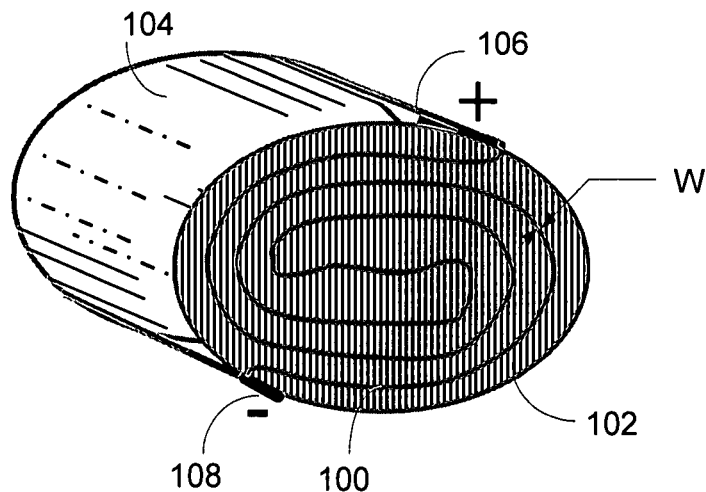
FIG. 2 is a perspective view of an example grid/heating element, as applied to a front surface of a PF in accordance with an embodiment of the present disclosure.

Referring to FIG. 2, a perspective view of an example grid/heating element 100, as applied to a front surface 102 of a PF/SCR element 104 is shown. The heating element 120 may be of various shapes and sizes and arranged in various configurations and patterns. For example, the width W of the heating element or conductive path thereof may vary per application. Although the heating element 120, as shown, has a single positive connector 106 and a single negative connector 108, it may have any number of connectors. Also, any number of heating elements may be incorporated. As another example, each connector pair and heating element and/or segmented portion thereof may be associated with a particular coverage zone on the front surface 102. Heating of the front surface 102 via multiple zones reduces the electrical impact on a PF system during regeneration. Each zone can be heated separately by supplying power to a pathway of resistive material located within each zone. In one embodiment, the heating element 100 is formed from a sheet of electrically resistive material, such as a metallic material, an example of which is stainless steel. The heating element may be stamped, milled, cut using a waterjet cutting machine, or formed using some other suitable technique.

By dividing the front surface 102 into multiple heated zones, the material of the heating element 100 can be dispersed more uniformly to evenly heat the front surface 102. This minimizes the cross-sectional area of a particular heated area and broadens soot combustion to adjacent channels. As a result, the total particulate matter consumed is maximized, while the amount of initially heated area and the amount of electrical power used for such heating is minimized. Within each zone, it is also appreciated that the heating element 100 may form resistive pathways or bands of material. The resistive pathways may be porous or have holes for exhaust flow therethrough. It is further appreciated that each of the zones may be heated sequentially, simultaneously, or selectively on an as needed basis.

Referring now to FIGS. 1 and 2, the control module 60 controls the heating of each zone individually. Switches 120, when incorporated, may be selectively activated and deactivated to allow current to flow to each zone. For example, voltage is supplied via the power source 80 to the switches 120.

Figure 3:
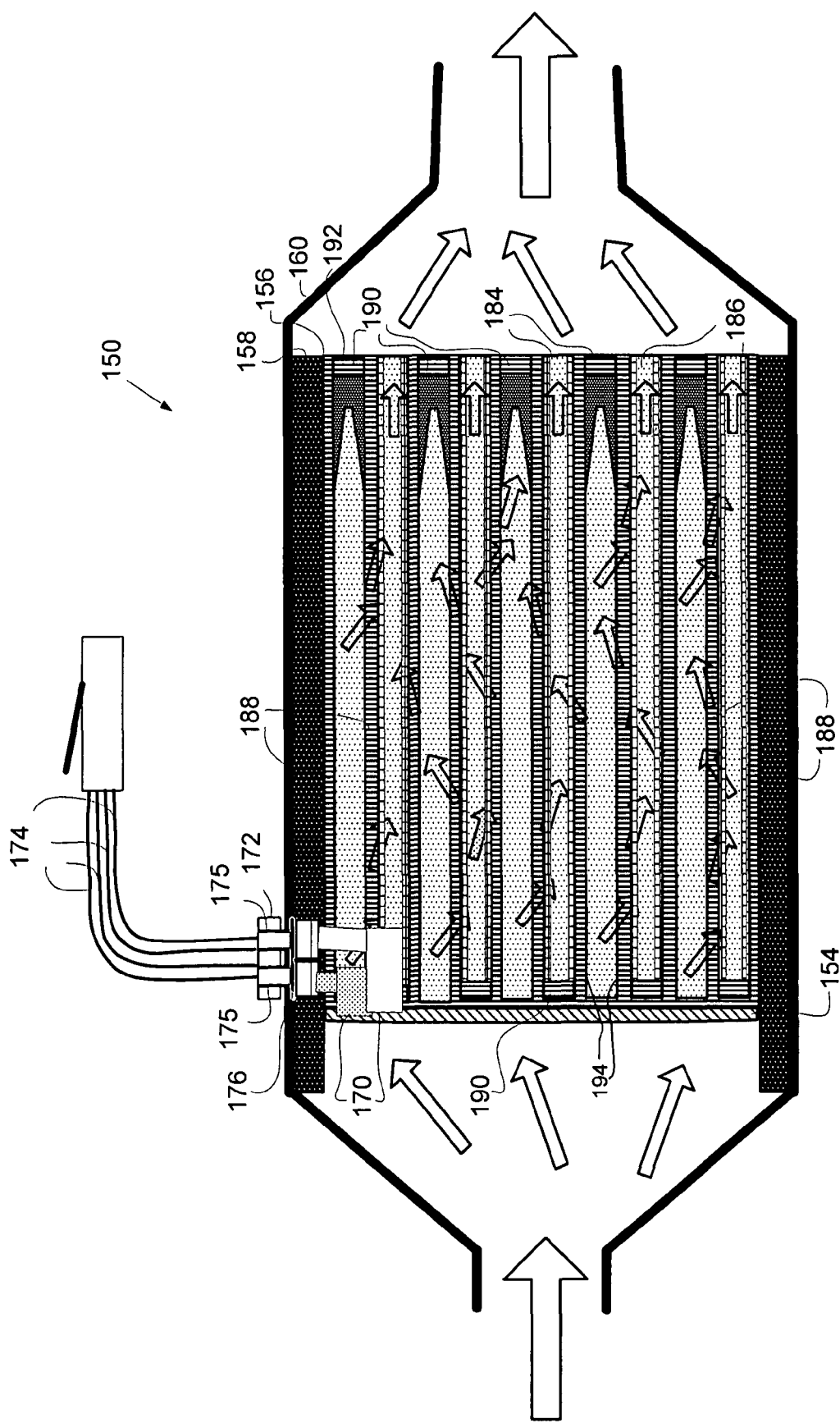
FIG. 3 is a cross-sectional side view of a PF system in accordance with an embodiment of the present disclosure.

Referring to FIG. 3, a cross-sectional side view of a PF system 150 is shown. The PF system 150, as shown includes a grid 154 and a PF/SCR element 156, which are coupled in series. The grid 154 and the PF/SCR element 156 are butted to each other and are held in place via a mat 158, which in turn is held by a housing 160. The mat 158, which is a semi-soft flexible sleeve, is wrapped around and tightly holds the grid 154 and the PF/SCR element 156. The mat 158 is then enclosed within the housing 160, which may be a welded can or canister, as shown. The mat 158 may be formed of an insulating material, such as vermiculite or other insulating material.

The PF system 150 also includes electrical contact terminals 170, which are coupled to the grid 154. A connector 172 connects insulated wires 174 via pins 175 to the terminals 170. Electrical energy is supplied via the wires 174 to each of the terminals 170. The connector 172 is coupled to the housing 160. The terminals 170 are sealed to the mat 158 via a high temperature conductive seal 176.

Note that the grid 154 may also be attached to the PF/SCR element 156 using various fasteners and/or fastening techniques. The attaching of the grid 154 to the PF/SCR element 156 controls movement of the heating element 154 when current is applied thereto. When temperature of the heating element 154 increases, the material of the heating element 154 expands. Since the heating element 154 may have a maximum operating temperature of approximately between 700-1000° C., the heating element 154 or portions thereof may exhibit a significant amount of shape change or lateral movement. The expansion movement is within the laterally planar section of the PF system 150 in which it is positioned. The use of fasteners aids in preventing or limiting such movement. The fasteners also prevent short circuits between adjacent portions of the heating element. In one embodiment, the fasteners are placed along the heating element or resistive/conductive path thereof at predetermined intervals, such as 2-5 centimeter intervals. Examples of such attachment are described with respect to the embodiments of FIGS. 8 and 9. The fasteners may be in the form of pins, barbed pins, plugs, tabs, clips, etc. The fasteners may be formed of metal or other suitable materials.

The PF/SCR element 156 may be a monolith particulate trap and includes alternating inlet cells/channels 184 and outlet cells/channels 186. The cells/channels 184, 186 extend axially along the PF/SCR element 156. Walls 188 of the PF/SCR element 156 may include a porous ceramic honeycomb wall of cordierite material. It is appreciated that any ceramic comb material is considered within the scope of the present invention. Adjacent channels are alternatively plugged at each end as shown at 190. This forces the diesel aerosol through the porous substrate walls which act as a mechanical filter. Particulate matter is deposited within the inlet channels 184 and exhaust exits through the outlet channels 186. Soot particles 192 flow into the PF/SCR element 156 and are trapped therein.

Figure 4:
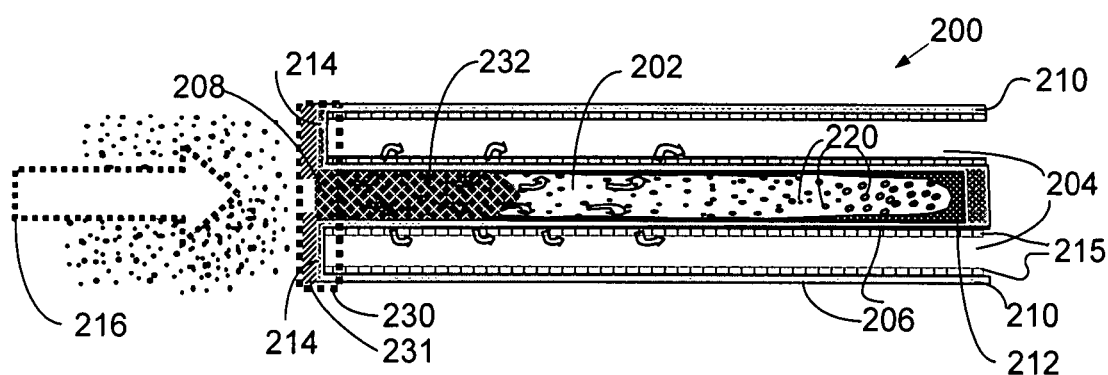
FIG. 4 is a cross-sectional view of a portion of a particulate filter (PF) in accordance with an embodiment of the present disclosure.

The outlet channels 186 or other portions of the PF/SCR element 156 may include SCR materials and/or elements. For example, the inner walls 194 of the outlet channels may be coated with SCR materials. This is best seen in FIG. 4. The SCR materials may include vanadium, zeolites, or other suitable SCR materials.

Referring to FIG. 4, a cross-sectional view of a portion 200 of a PF/SCR element, such as the PF/SCR element 156, is shown. The portion 200 includes multiple inlet cells/channels 202 and outlet cells/channels 204, which have associated channel walls 206. The inlet channels 202 have inlets 208 and the outlet channels 204 have outlets 210. The inlet channels 202 are in an alternating arrangement relative to the outlet channels 204. The inlet channels 202 have outlet plugs 212 and the outlet channels 204 have inlet plugs 214. The outlet plugs 212 and the inlet plugs 214 may be integrally formed as part of the walls 206.

The walls 206 may include and/or be coated with SCR materials. As shown, the walls 206 include SCR layers 215 coated thereon. The walls 206 perform as filters and as a catalyst for an entering engine exhaust, designated by arrow 216. The exhaust 216 enters the inlets 208 and passes from the inlet channels 202 to the outlet channels 204 through the walls 206. The walls 206 prevent particle matter 220 from entering the outlet channels 204. Thus, the matter collects in the inlet channels 202 against the walls 206. The SCR catalyst in the walls 206 promotes the reaction of liquid reductant with $NO_x$ in the exhaust gas to form $H_2O$ (water vapor) and $N_2$ (nitrogen gas). A gaseous or liquid reductant, such as ammonia or urea, may be added to the exhaust. The liquid is then absorbed onto the walls 206.

To remove the collected particle matter or soot 220, inlet regions 230 proximate to the inlets 208 are heated via a heating element(s) 231. When the exhaust 216 is heated in the inlet region 230, the collected particle matter in that region ignites to create a flame. An example of the flame is shown and designated 232. The flame is generated from the burning of the particle matter travels along and within the associated inlet channels of the PF/SCR element. This heating may be generated via an electrical interface, such as one or more heating elements, as described in more detail herein. The heating is accomplished with minimal electrical power. The heating provides uniform heat distribution and limited peak temperatures within the PF/SCR element, thereby preventing damage to the PF/SCR element. The heating may be performed during a low fuel consumption regeneration cycle. In other words, a minimal amount of fuel may be injected in the exhaust system and/or PF system during regeneration of the PF/SCR element.

Figure 5A:
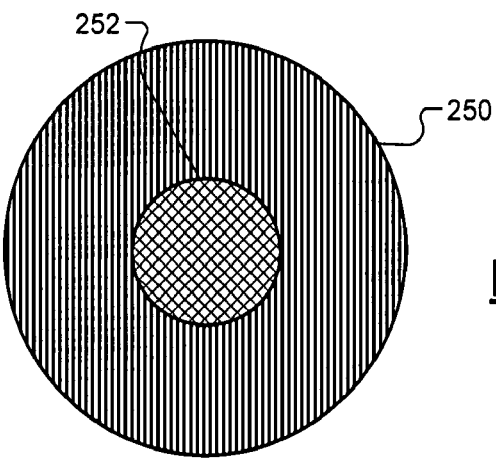
FIG. 5A is a is a front view illustrating heating of a zone of a particulate filter (PF) in accordance with an embodiment of the present disclosure.
Figure 5B:
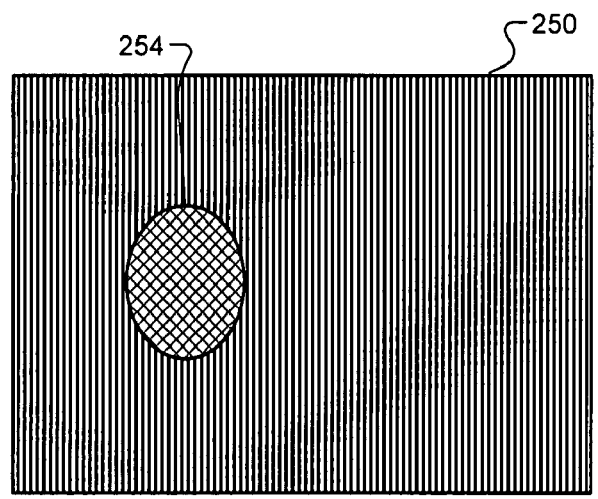
FIG. 5B is a side view illustrating a heated portion of the PF of FIG. 5A for a first time period of a regeneration process in accordance with an embodiment of the present disclosure.
Figure 5C:
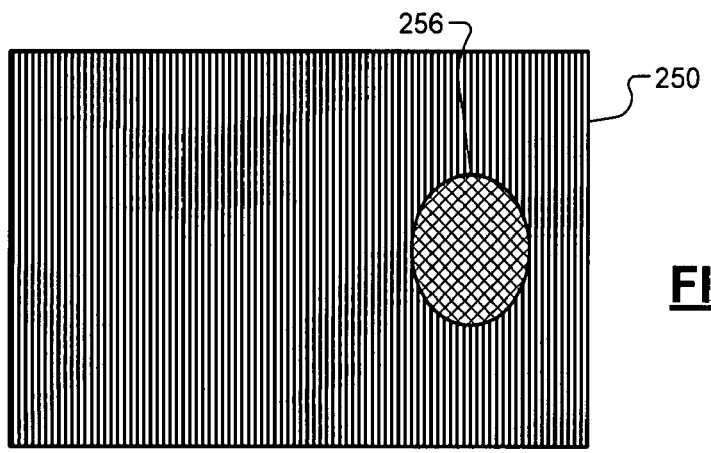
FIG. 5C is a side view a heated portion of the PF of FIG. 5A for a second time period of a regeneration process in accordance with an embodiment of the present disclosure.

Referring to FIGS. 5A-C, front view and side views illustrating zone heating of and thermal energy propagation in a PF/SCR element 250 are shown. In FIG. 5A, a centrally located zone 252 is shown, which may be selected and heated in a regeneration process. Note that the front surface of the PF/SCR element 250 may be divided into any number of zones. The front surface of a selected zone is heated to ignite particulate matter near that front surface. The ignition/thermal energy generated propagates longitudinally along the PF/SCR element 250.

FIGS. 5A and 5B, illustrate ignition/thermal energy of particulate matter in the PF/SCR element 250 during different moments in time of the regeneration process. FIG. 5A, provides an example of ignition of a first portion 254 of the PF/SCR element 250 at approximately 15 s from initial ignition of the front surface. FIG. 5B, provides an example of ignition of a second portion 256 of the PF/SCR element 250 at approximately 30 s from initial ignition of the front surface. Time to perform the regeneration process may vary per application.

Note that a small percentage of the PF/SCR element 250 is ignited at any instance in time. Thus, a significant portion of the PF/SCR element 250 may perform as a catalyst and remove NOx. In one embodiment, 20% of the front surface is heated and thus 3-5% of the PF/SCR element 250 is being ignited and is thus in a SCR deactive state. The remaining 95-97% is in a SCR active state. When in a SCR active state, that associated portion of the PF/SCR element 250 is operating in a temperature range suitable for NOx removal. For example, portions of the PF/SCR element 250, which are not ignited, may be operating in a temperature range of approximately 200-300° C. This allows SCR materials to be active in removing NOx. As another example, when the active volume of the PF/SCR element 250 is active and when the SCR materials of the PF/SCR element 250 are 97% efficient in removing NOx, the NOx removal efficiency of the PF/SCR element 250 during regeneration may be approximately equal to or greater than 90%.

Figure 6:
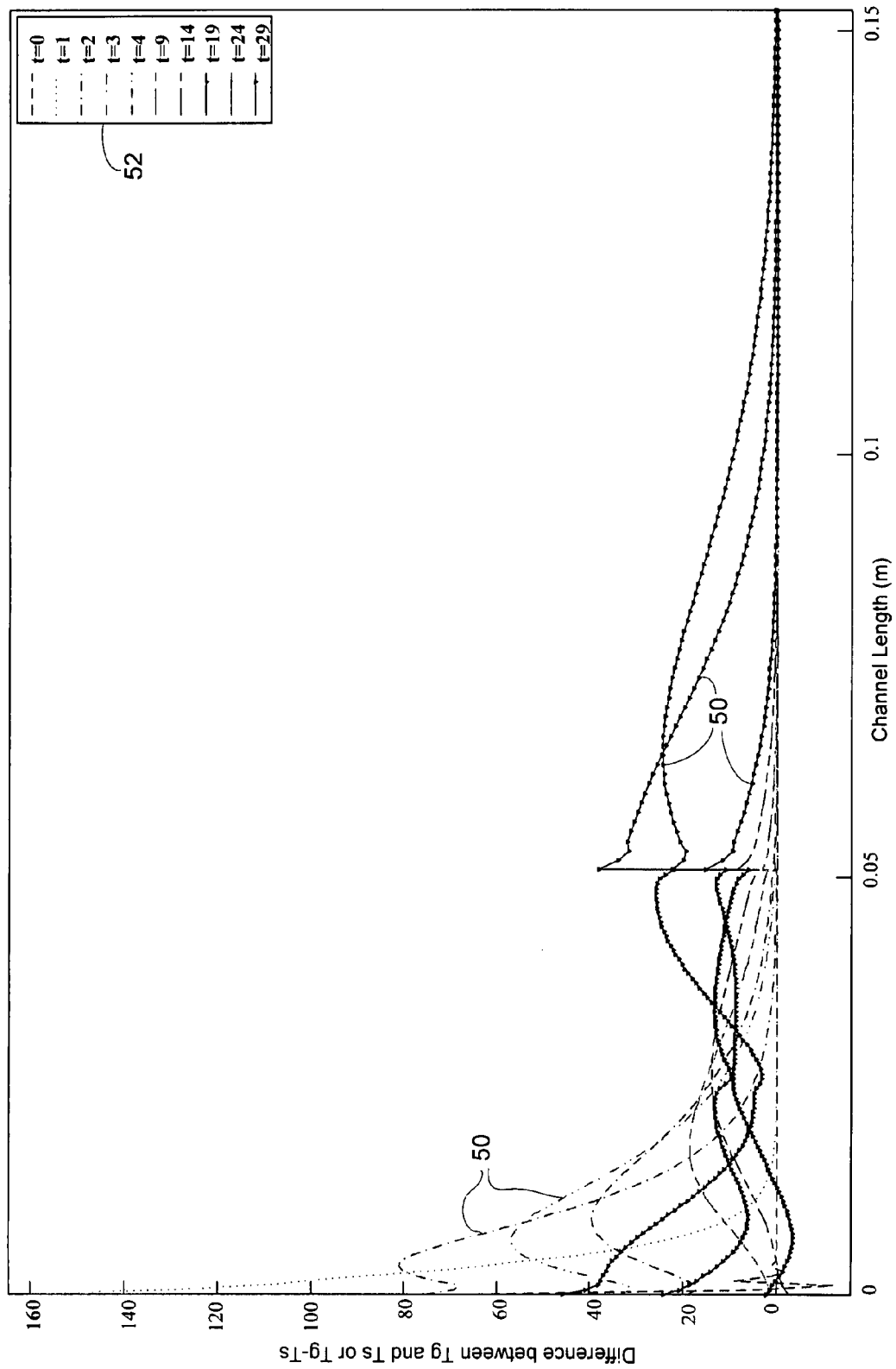
FIG. 6 is a graph illustrating a temperature profile within the length of a catalyst substrate or PF during a cold start emission test.

Referring to FIG. 6, a graph illustrating a temperature profile within the length of a catalyst substrate or PF during a cold start emission test is shown. The catalyst substrate has multiple catalyst bricks, which are coupled in series. A contact point between a front catalyst brick and a rear catalyst brick is represented by a spike in temperature differences at 0.05 m. The spike is caused by a misalignment between channels of the catalyst bricks. Multiple curves 50 are shown and represent time in seconds, as provided by the key 52. The curves 50 provide a relationship between the difference in $T_{gas}$ and $T_{solid}$ for the PF versus channel length or position along the longitudinal length of the channel. $T_{gas}$ is the temperature of the exhaust and $T_{solid}$ is the temperature of the substrate.

As can be seen from the graph, a large temperature loss occurs at a front surface of the PF, due to turbulent heat transfer at the inlets of the PF or cell entrance locations. The front surface corresponds with channel length 0. The hot exhaust gas heats up the front surface of the PF where the flow is highly turbulent. The hot exhaust gas heats the front surface until a thermal equilibrium is met over time. Since the flow of the exhaust becomes laminar a short distance down the channels of the PF, the heat transfer loss decreases. Thus, the rear surface of the PF, where the exhaust flow is laminar, experiences a gradual change in temperature with time. The $T_{gas}$/$T_{solid}$ temperature difference approaches 0 near the rear surface. For this reason, the rear surface experiences smaller thermal losses than the front surface.

Thus, a heating element is used to raise the temperature of the substrate to oxidize the soot on the front surface. This prevents heating element energy loss due to convective heating of the exhaust gas, which then flows thru the substrate walls and out "clean" cold outlet channels thereof.

When a PF heating element is used to heat the front surface of the PF, the temperature of the heating element is increased to exceed an ignition point of the soot. Heating a front surface of a PF to a hot enough temperature that allows particulate matter to burn creates a flame front that propagates down or longitudinally along the channel of the PF cleaning the soot from the filter. The PF may be formed of electrically resistive material, which provides an efficient technique to generate heat. However, thermal losses to a cooler exhaust gas, as well as radiant heat loss to metal exhaust pipes increases the electrical power used to meet desired ignition temperatures. When the heating element receives turbulent exhaust flow, a significant amount of heat loss is exhibited, which reduces the temperature of the heating element. A large portion of this heat loss is radiant heat loss.

Radiant heat loss is energy emitted from a high temperature object and is usually infrared light. Since particulate matter requires high temperatures for combustion, the radiant heat losses are a significant source of lost energy. The Stefan-Boltzmann law states that the power loss due to radiant energy is proportional to the fourth power of a temperature difference between emitting and absorbing surfaces, ie: $Q_{RAD} \sim A(T_H^4 - T_L^4)$. $Q_{RAD}$ is radiant heat loss, A is the Stefan-Boltzmann law constant, $T_H$ is the temperature of the heating element, and $T_L$ is the temperature of the exhaust gases and/or other components near the heating element. Because the heating element temperature needed to initiate soot burn is high, the heating surface radiant heat loss associated with the heating element is high.

To contain or reflect this radiant energy and utilize this energy to facilitate the burning of the soot, catalyst substrate/flow converter implementations are used, as described below. To achieve high heating element temperatures needed for soot ignition, with minimum electrical power, convective losses to exhaust gas flow are minimized. This is done by converting turbulent exhaust flow to laminar exhaust flow. A flow converter converts turbulent flow into laminar flow prior to reception by a heating element. In the below described embodiments, radiant energy losses are reduced by allowing the radiant energy to reflect and/or be contained on a surface of a shielding substrate near a heating element. Hence conductive heat losses to an exhaust piping are reduced, and the radiant energy is contained near the heating element itself. The stated energy reflection and containment significantly improves the electrical efficiency of regenerating a PF.

Referring to FIG. 7, a cross-sectional side view of a PF system 150' is shown. The PF system 150', as shown includes a flow converter 152, the grid 154 and the PF/SCR element 156, which are coupled in series. The flow converter 152, the grid 154 and the PF/SCR element 156 are butted to each other and are held in place via a mat 158', which in turn is held by a housing 160'. During the manufacturing of the PF system 150' the flow converter 152, the grid 154 and the PF/SCR element 156 are butted together and held in place. This assures that the grid 154 is held between the flow converter 152 and the PF/SCR element 156. The mat 158' is wrapped around and tightly holds the flow converter 152, the grid 154 and the PF/SCR element 156.

Note that the grid 154 may also be attached to the flow converter 152 or the PF/SCR element 156. The heating element 154 may be attached to the flow converter 152 or the PF/SCR element 156 using various fasteners and/or fastening techniques some of which are described herein. The attaching of the grid 154 to the flow converter 152 or the PF/SCR element 156 controls movement of the heating element 154 when current is applied thereto.

The flow converter 152 may include a catalyst substrate, such as a diesel oxidizing catalyst (DOC). As such, the flow converter 152 may perform as a heat shield and oxidize exhaust based on a post combustion air/fuel ratio. The amount of oxidation increases the temperature of the exhaust. In one embodiment, the flow converter 152 includes and/or is an open cell/channel substrate and the PF/SCR element 156 includes and/or is a closed cell/channel substrate. The flow converter 152 has an internal flow through configuration whereas the PF/SCR element 156 performs as a filter.

Use of the flow converter 152, alleviates the above-described radiant thermal losses and maintains laminar exhaust flow on the heating element 154. The flow converter 152 converts turbulent exhaust flow into laminar exhaust flow prior to reception by the heating element 154. This improves the heating element efficiency by allowing laminar exhaust flow over the surfaces of the heating element 154.

The flow converter 152 is configured similar to the PF 156. However, the flow converter does not have endplugs and is thus in a flow through configuration. The flow converter 152 may undergo one or more various processes to improve the radiant reflective properties thereof. For example, the flow converter 152 may be metallically coated. The flow converter 152 may perform as or be replaced with a radiant energy reflector block. A radiant energy reflector block may be sized and located the same as the flow converter 152. The radiant energy reflector block reflects radiant energy. The radiant energy reflector block may provide a turbulent flow exchange as opposed to a turbulent to laminar flow exchange. The flow converter/radiant energy reflector block may be of various sizes, shapes and configurations. Although not shown, the flow converter has channels similar to the channels 184, 186, in which the below described fasteners may attach. The grid 154 attaches to the rear surface 194 of the flow converter 152.

Figure 8:
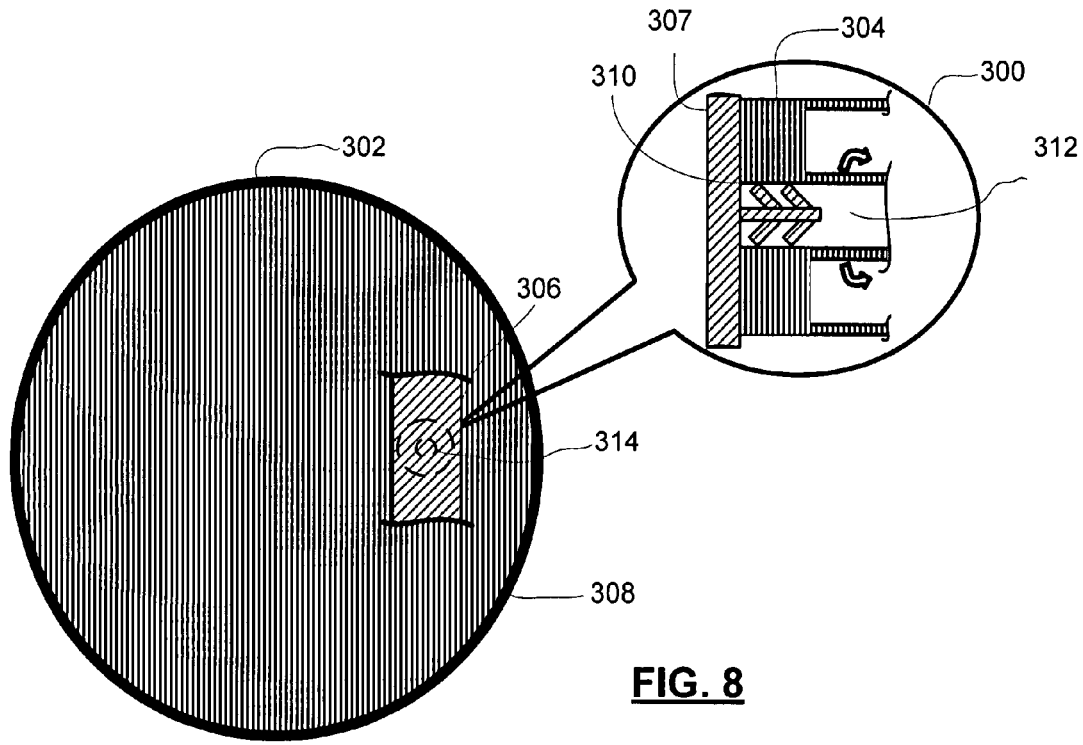
FIG. 8 is a close-up cross-sectional side view of a portion of a PF illustrating an example heating element fastener in accordance with an embodiment of the present disclosure.
Figure 9:
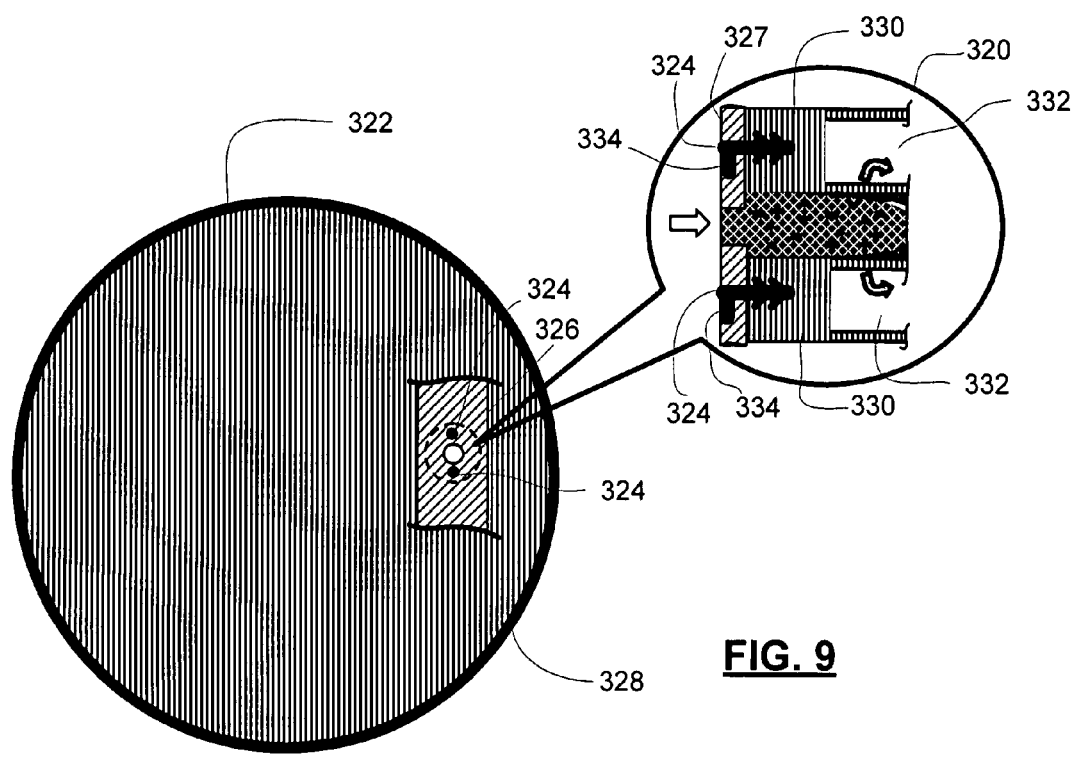
FIG. 9 is a close-up cross-sectional side view of a portion of a PF illustrating example heating element fasteners in accordance with another embodiment of the present disclosure.

Although the following FIGS. 8 and 9 are described primarily with respect to the attachment of a heating element to a PF/SCR element, the heating element may be attached to other catalyst substrates or to a flow converter using similar techniques.

Referring to FIG. 8, a close-up cross-sectional side view of a portion 300 of a PF/SCR element 302 illustrating an example heating element fastener 304 is shown. A pathway section 306 of a heating element 307 is shown over a front surface 308 of the PF/SCR element 302. The heating element 307 is held onto the front surface 208 via one or more fasteners, such as the fastener 304. The fastener 304 may be integrally formed as part of the pathway section 306 and be inserted into an inlet 310 of a channel 312. The fastener 304 may be shaped or formed to allow easy assembly, but difficult disassembly. For example, the fastener 304 may be a barbed tab as shown or take on some other form. The fastener 304 may not completely plug the inlet 310 and thus may allow for exhaust flow therethrough. An opening 314 is shown through which exhaust may flow. As such, the fastener 304 may wick heat into the channel 312, which further facilitates the burning of the soot therein.

Referring to FIG. 9, a close-up cross-sectional side view of a portion 320 of a PF/SCR element 322 illustrating example heating element fasteners 324 is shown. A pathway section 326 of a heating element pathway of a heating element 327 is shown over a front surface 328 of the PF/SCR element 322. The heating element pathway is held onto the front surface 328 via the fasteners 324, which are shown as pins. The fasteners 324 may be inserted into or attached to endplugs 330 of outlet channels 332 of the PF/SCR element 322. The fasteners 324 may also be created and/or formed as part of the endplugs 330. The fasteners 324 may be embedded into the PF/SCR element 322, as shown, and allow for the attachment of the heating element pathway. The heating element pathway may be snapped under ends 334 of the fasteners 324. Note that the heating element pathway may be porous and allow for exhaust flow therethrough, as shown. As an alternative, the heating element pathway may be arranged on the PF, such that the inlet channel openings are positioned between pathway sections.

Figure 10:
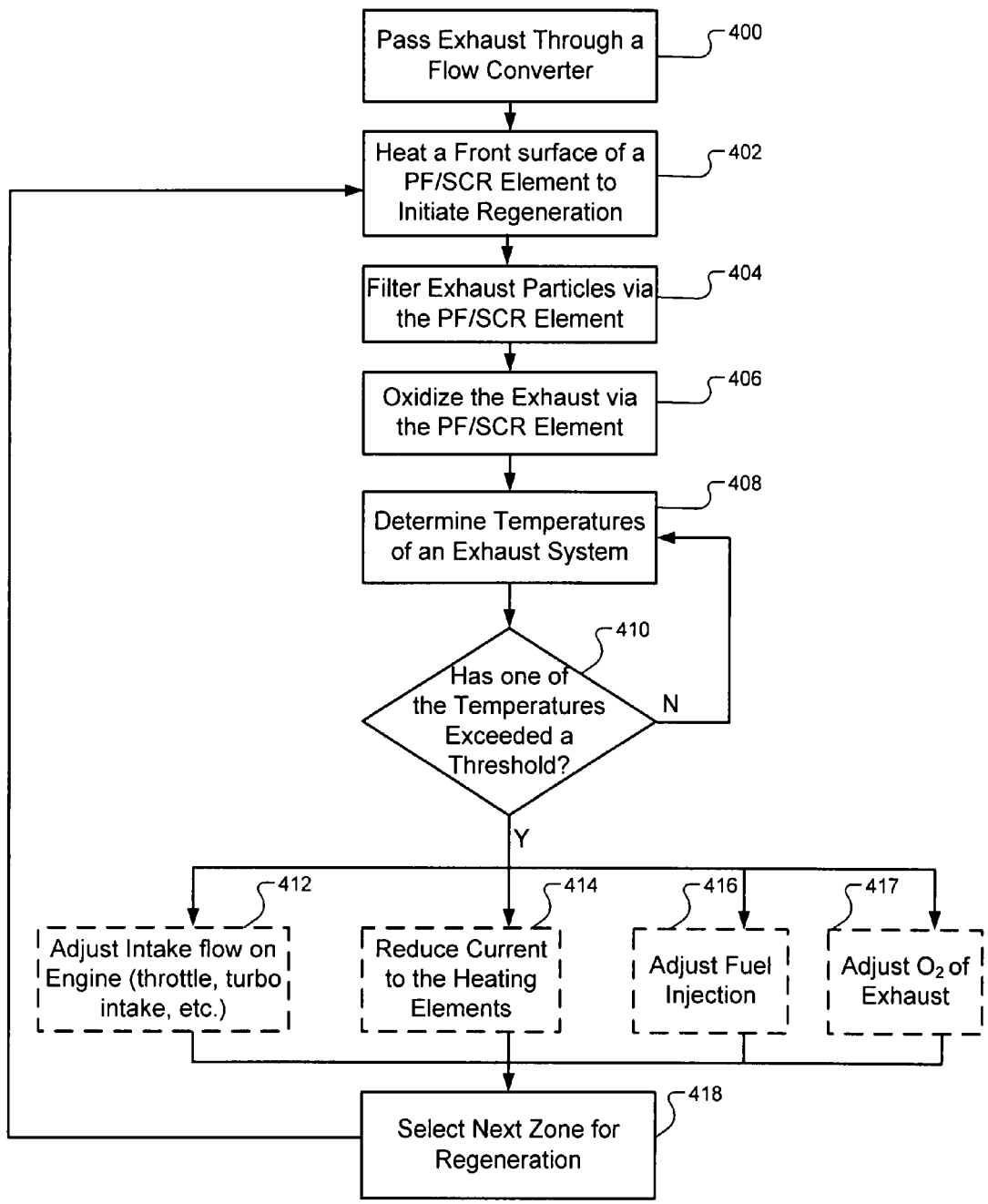
FIG. 10 is a logic flow diagram illustrating a method of performing a PF regeneration process within an exhaust system in accordance with an embodiment of the present disclosure.

Referring to FIG. 10, a logic flow diagram illustrating a method of performing a PF regeneration process within an exhaust system is shown.

In step 400, an exhaust from an engine is passed through a flow converter, such as the flow converter 152. The flow converter converts turbulent flow of the exhaust to laminar flow prior to reception by a heating element (grid).

In step 402, the exhaust after passing through the flow converter passes through or across a heating element, such as one of the heating elements (grids) 82, 154 and 231. The heating elements increase temperature of the exhaust to ignite particles within selected portions of a PF/SCR element, such as one of the PF/SCR elements 54 and 156. A selected zone or zones of the heating elements are selected and activated. The heating of a front surface of the PF/SCR element initiates regeneration without injection of fuel in the exhaust. Although fuel may be injected in the exhaust to further heat and ignite the particulate matter in the PF. In one embodiment, fuel is not injected into the exhaust when performing the regeneration process.

In step 404, the PF/SCR element filters particulates from the exhaust, as described above. In step 406, the PF/SCR element promotes reaction of a liquid reductant with the exhaust via a reducing catalyst included on the PF, such as by the SCR layers 215.

In step 408, temperatures of the heating elements, of the exhaust, of the PF/SCR element, and/or other temperatures are determined. The temperatures may be directly or indirectly determined. When directly determined, the temperature signals may be received from sensors, such as the sensors 62. When indirectly determined, exhaust flow rate, air intake flow rate, oxygen levels, fuel injection into engine cylinders, and other parameters may be determined via a control module, such as the control module 60. These parameters may also be directly and/or indirectly determined via the sensors 62 or through use of other known techniques. An algorithm may be used to determine the temperatures. Tables may be stored in memory to determine the temperatures from the stated parameters, known operating conditions, and known operating characteristics of the engine system.

In step 410, the control module determines when one or more conditions exist, such as whether one or more of the temperatures has exceeded associated predetermined thresholds. When one or more of the thresholds have been exceeded, the control module may proceed to steps 412-416, otherwise the control module may continue with the regeneration process and return to step 408 or proceed to step 418. When it is determined that the regeneration process is complete for a particular zone the control module proceeds to step 418. In one embodiment, when the temperature of the heating elements is equal to or greater than approximately 800-850° C., the control module proceeds to steps 412-416.

In steps 412-416, the control module may adjust air intake flow rate, exhaust flow rate, fuel injector operation, heating element current, exhaust oxygen ($O_2$) levels, and/or other operating aspects based on the determined conditions. Fuel injection operation to the engine and/or the exhaust may be adjusted. For example, the control module may perform such adjustment to reduce one or more temperatures of concern. As a more specific example, the control module may reduce temperatures of the heating elements and/or the PF/SCR element. For example, the control module may reduce current supplied to the heating elements to reduce temperature of the heating elements and thus temperature of the PF/SCR element.

As an example of oxygen control, fuel and/or air injection into an engine may be adjusted to provide a richer or leaner air/fuel mixture. Post injection may also be used to adjust oxygen levels. A post injection valve or other device may be used for post injection of fuel into an engine cylinder and/or downstream therefrom. The fuel is injected after a combustion stroke in the engine cylinder and may be during an exhaust stroke thereby allowing fuel to enter the exhaust.

In step 418, the control module may select a subsequent zone to perform regeneration or end the regeneration process. Upon completion of step 418, the control module may return to step 402.

The above-described steps are meant to be illustrative examples; the steps may be performed sequentially, synchronously, simultaneously, continuously, or in a different order depending upon the application.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust system comprising:
a canister that is disposed downstream from an engine;
a particulate filter (PF) that is disposed within said canister and that filters particulates within an exhaust from said engine;
a reducing catalyst that is disposed on said PF and that promotes reaction of a liquid reductant in said exhaust after reception by said PF;
a heating element that comprises N zones, that is disposed within said canister and that heats particulate matter in said PF, where N is an integer greater than 1; and
a control module adjusts current to said heating element to heat a first one of said N zones and initiate regeneration of a first portion of said PF corresponding to said first one of said N zones,
wherein said control module prevents heating of a second one of said N zones by said heating element while heating said first one of said N zones,
wherein a second portion of said PF corresponding to said second one of said N zones reduces nitrogen oxide in the exhaust while said first portion is regenerated.

2. The exhaust system of claim 1 further comprising a mat, wherein said PF, said reducing catalyst and said heating element are disposed within said mat and held in position relative to each other via said mat.

3. The exhaust system of claim 1 further comprising:
a mat;
a plurality of terminals that provide electrical current to said heating element; and
a heat seal coupled between said mat and said plurality of terminals.

4. The exhaust system of claim 1 further comprising:
a control module that activates said heating element; and
a temperature sensor that generates a temperature signal,
wherein said control module adjusts an oxygen level in said exhaust when said temperature signal exceeds a threshold.

5. The exhaust system of claim 1 wherein said N zones are on an inlet surface of said PF.

6. The exhaust system of claim 1 wherein said control module controls current to said heating element to heat and initiate regeneration of said PF without increasing fuel in said exhaust.

7. The exhaust system of claim 1 wherein:
said first portion comprises less than or equal to 5% of said PF and said reducing catalyst; and
said second portion comprises greater than or equal to 90% of said PF and said reducing catalyst.

8. The exhaust system of claim 1 wherein said first of said N zones heats less than or equal to 20% of an inlet surface of said PF.

9. The exhaust system of claim 1 wherein:
each of said N zones heats less than or equal to 20% of an inlet surface of said PF;
said control module controls current to said N zones during N non-overlapping periods; and
each of said N zones is heated in a respective one of said N non-overlapping periods.

10. The exhaust system of claim 1 wherein said control module adjusts current to said heating element based on temperature of said heating element.

11. The exhaust system of claim 10 wherein said control module estimates said temperature of said heating element based on an exhaust flow rate, an air intake flow rate, an oxygen level, and fuel level.

12. The exhaust system of claim 1 wherein:
said control module adjusts current to said heating element based on a temperature of said PF and reducing catalyst estimated based on a temperature of said heating element, a temperature of said exhaust, and a flow rate of said exhaust; and
said control module adjusts an oxygen level of said exhaust based on said temperature of said PF and reducing catalyst.

13. The exhaust system of claim 12 wherein said control module estimates said temperature of said PF and reducing catalyst based on an exhaust flow rate, an air intake flow rate, an oxygen level, and fuel level.

14. The exhaust system of claim 1 further comprising:
a control module that activates said heating element; and
a temperature sensor that generates a temperature signal,
wherein said control module reduces current flow to said heating element when said temperature signal exceeds a threshold.

15. The exhaust system of claim 14 wherein said control module adjusts intake air flow of said engine and a fuel level in said exhaust when said temperature signal exceeds said threshold.

16. An exhaust system comprising:
a particulate filter (PF) that is disposed downstream from an engine and that filters particulates within an exhaust from said engine;

a reducing catalyst that coats at least a portion of said PF and that promotes reaction of a liquid reductant in said exhaust; and a heating element that comprises N zones, that receives a current signal and that heats particulate matter in said PF, where N is an integer greater than 1, and a control module adjusts current to said heating element to heat a first one of said N zones and initiate regeneration of a first portion of said PF corresponding to said first one of said N zones, wherein said control module prevents heating of a second one of said N zones by said heating element while heating said first one of said N zones, wherein a second portion of said PF corresponding to said second one of said N zones performs reduces nitrogen oxide in said exhaust while said first portion is regenerated.

17. The exhaust system of claim 16 further comprising a housing, wherein said PF, said reducing catalyst, and said heating element are disposed within said housing and held in position relative to each other via said mat.

18. The exhaust system of claim 16 further comprising a flow converter that converts turbulent flow of said exhaust to laminar flow prior to reception by said heating element.

19. A method of performing a regeneration process within an exhaust system comprising:

passing an exhaust from an engine through a heating element;

heating particulate matter in a particulate filter (PF) via said heating element, the heating element comprising N zones, where N is an integer greater than 1;

filtering particulates from said exhaust with said PF; and reacting a liquid reductant with said exhaust via a reducing catalyst on said PF, adjusting current to said heating element to heat a first one of said N zones and initiate regeneration of a first portion of said PF corresponding to said first one of said N zones; and preventing heating of a second one of said N zones by said heating element while heating said first one of said N zones, wherein a second portion of said PF corresponding to said second one of said N zones performs reduces nitrogen oxide in said exhaust while said first portion is regenerated.

20. A method as in claim 19 further comprising:

determining when a temperature of at least one of said heating element, said PF, and said reducing catalyst has exceeded a threshold; and reducing temperature of said heating element when said threshold is exceeded.

21. A method as in claim 19 wherein heating said particulate matter comprises igniting particulates to initiate a burn that propagates longitudinally along said PF.

* * * * *

UNITED STATES PATENT AND TRADEMARK OFFICE
CERTIFICATE OF CORRECTION

| | | |
|---|---|---|
| PATENT NO. | : 7,886,529 B2 | Page 1 of 1 |
| APPLICATION NO. | : 11/807925 | |
| DATED | : February 15, 2011 | |
| INVENTOR(S) | : Eugene V. Gonze et al. | |

It is certified that error appears in the above-identified patent and that said Letters Patent is hereby corrected as shown below:

In Col. 1, line 4, insert after the application title "Electrically Heated DPF/SCR 2-Way System", the following statement of government rights:

--STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.--

Signed and Sealed this
Twelfth Day of April, 2011

David J. Kappos
*Director of the United States Patent and Trademark Office*